United States Patent [19]

Delacoste

[11] 4,154,789
[45] May 15, 1979

[54] THERMOPLASTIC BALL AND METHOD OF MANUFACTURING SAME

[75] Inventor: Claude Delacoste, Paris, France

[73] Assignee: Delacoste & Cie, S.A., Paris, France

[21] Appl. No.: 779,349

[22] Filed: Mar. 21, 1977

[30] Foreign Application Priority Data

May 25, 1976 [FR] France .................................. 76 15728
Dec. 22, 1976 [FR] France .................................. 76 38646

[51] Int. Cl.² .......................... B29C 5/04; B29D 9/00
[52] U.S. Cl. ..................................... 264/138; 264/248;
264/255; 264/263; 264/310; 264/DIG. 60
[58] Field of Search ............... 264/250, 255, 310, 311,
264/248, 138, 267

[56] References Cited

U.S. PATENT DOCUMENTS

| | | | |
|---|---|---|---|
| 2,839,788 | 6/1958 | Dembiak | 264/310 |
| 3,095,260 | 6/1963 | Ferriot | 264/311 |
| 3,246,069 | 4/1966 | Maynord | 264/310 |

*Primary Examiner*—W. E. Hoag
*Attorney, Agent, or Firm*—Gottlieb, Rackman & Reisman

[57] ABSTRACT

This ball made of thermoplastic material has physical properties substantially akin of those of conventional leather balls, and comprises at least two layers of thermoplastic material molten successively in a same mold and adhering completely to each other; the external layer consists of a material selected from the group of polyamids, thermoplastic elastomers, plastisols and polyurethanes, and the internal layer consists of a material selected from the group comprising thermoplastic elastomers, polyurethanes, polyesters and polyester-polyethers. The ball is manufactured by rotational molding consisting in casting successively into a mold made of two detachable complementary portions and to which a planetary motion is imparted, thermoplastic materials constituting the ball-forming layers, from the external layer to the innermost layer, the material for forming one of the internal layers being introduced after opening the mold at a temperature such that the material forming the preceding layer or layers has not melted completely, thus permitting the breaking of said layer or layers at the level of the joint between the two mold portions. This ball is suitable for games such as football, soccer, rugby, volley-ball, hand-ball, and the like.

3 Claims, 2 Drawing Figures

U.S. Patent  May 15, 1979  4,154,789
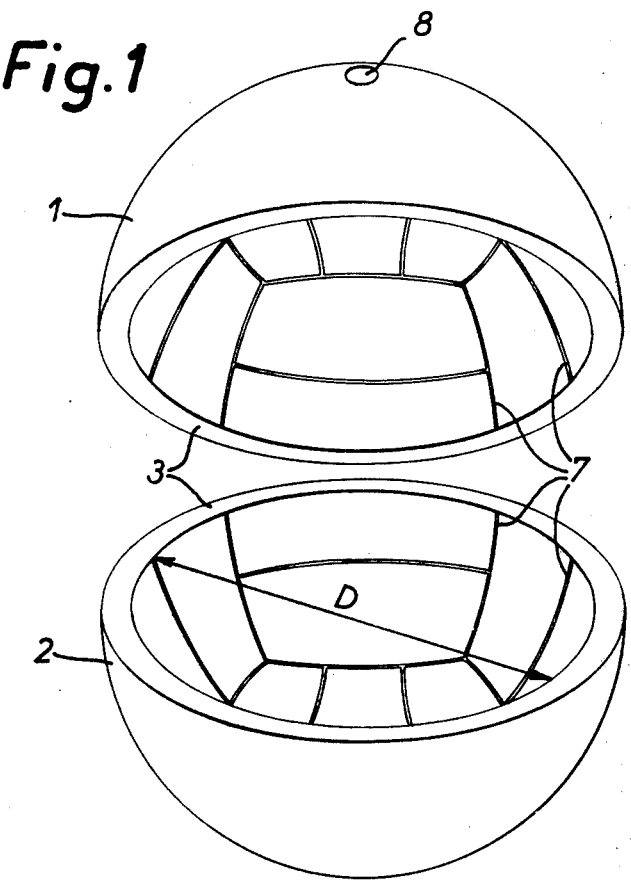
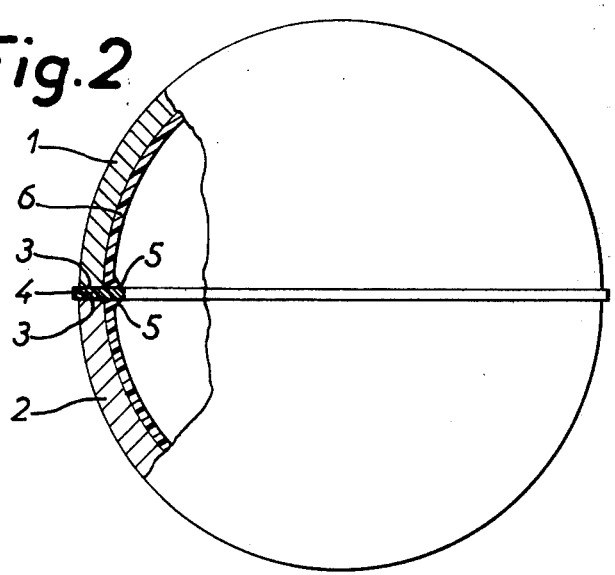

THERMOPLASTIC BALL AND METHOD OF MANUFACTURING SAME

BACKGROUND OF THE INVENTION

The present invention relates to a ball, more particularly for sporting games, which consists of thermoplastic material, and to the method of manufacturing same.

It is known that the balls used in playing sports games and notably competition games must meet certain requirements as to weight, size, rebound, resilience, resistance to high and low temperatures, etc . . .

The increasing popularity of sports has led to the development of synthetic raw materials for manufacturing balls at a cost lower than that of leather balls, since leather, the hitherto essential and standard material utilized in the manufacture of sports balls, is rather expensive, while endeavoring to impart to the plastic balls properties as close as possible to those of leather balls.

A first method of manufacturing sports balls consisted in operating by rotational molding under standard conditions from thermoplastic materials in the initial form of dough or in crosslinked form, or from thermoplastic materials adapted to be cross linked during the manufacturing process.

More recently, vinyl chloride products have also been used either in the form of dough or plastisol or in the form of dry powder.

Additives intended for modifying more particularly the ball resilience in order to obtain a predetermined rebound have also been incorporated in these synthetic materials.

Thus, the results obtained up to now led to the manufacture and sale of thermoplastic balls, but all attempts to obtain an exact replica of a leather ball did not give fully satisfactory results.

When selecting new raw materials having the desired properties it is also necessary to take due account of the temperatures at which the game is to be played with the ball. Thus, suitable limits to this range may be $-15°$ C. to $+30°$ C., which corresponds to temperatures in temperate areas during the seasons in which the game can be played. Besides, the practice of football and like contests are excluded outside this temperature range. It is clear that a product tending to harden considerably at a temperature below $0°$ C. is not suitable.

Moreover, the rebound obtained with a competition ball (U.S. football, Association football, rugby union, basket ball, volley ball) should be set for the above-mentioned temperature range in which the game can be played; in fact, leather is basically insensitive to temperature. Thus, by way of example, a football association ball must rebound at 65 percent of the initial height.

Since the ball must be utilized in relatively variable seasons, it must also have a good resistance to humidity. Furthermore, it must be distortion-free, especially in the case of a football association ball exposed to very severe strain (percussion, etc.).

The external layer must have a good resistance to abrasion, since the ball might be used on a sandy pitch or indoor, especially in the case of handball, volley-ball and like games.

In actual practice, all these properties are not required in the case of a play ball for children; however, the possibilities afforded by selecting the proper materials will obviously lead to a very substantial improvement in the properties of play balls of this type.

SUMMARY OF THE INVENTION

Now it was found according to the instant invention that these desired resilience and hardness properties cannot be obtained in a very satisfactory manner by using the now commercially available products in the form of a single layer. On the other hand, if a ball is manufactured by using at least two layers of thermoplastic material of well-defined composition, the desired properties can be obtained, as a function of the desired result, together with a reaction to the feel and a satisfactory leather-like appearance; the ball according to this invention is in fact characterized essentially in that it comprises at least two separate layers adhering perfectly to each other, the external layer consisting of a thermoplastic material selected from the group of polyamid thermoplastic materials, thermoplastic elastomers, plastisols and polyurethanes, the internal layer consisting of a thermoplastic material selected from the group of thermoplastic elastomers, polyurethanes, polyester-type materials and polyether-polyester type materials.

DESCRIPTION OF THE PREFERRED EMBODIMENTS

By properly combining the nature of the component layers and varying their weight, it is possible to obtain sports balls, for example for soccer, rugby, volley-ball, hand-ball etc. all having the various or different physical and mechanical properties, notably the reaction to hand feel, resistance to low temperature, resilience, resistance to humidity, resistance to deformation, to abrasion, etc., depending on the desired result.

The polyamids employed for making the external layer consist for example of polyamids of the type marketed by Shering (Germany), and General Mills (U.S.A.) under the registered Trade Marks "Versalon" and "Versamides", the polyamids marketed by Jefferson Chemical (U.S.A.) under the Trade Mark "Jeffamine", as well as the EMEREZ resins manufactured and sold by Emery (U.S.A.) and Unilever Emery (Holland).

A preferred thermoplastic elastomer for making the external layer is the product known under the Trade Mark "T.P.R." (Thermo Plastic Rubber) marketed by Uniroyal Corp. (U.S.A.) disclosed in the U.S. Pat. No. 3,806,558 patented on Apr. 23, 1974 and entitled "Dynamically partially cured thermoplastic blend of monolefin copolymer rubber and polyolefin plastic".

Among plastisols also suitable for forming this outer layer, those derived from polyvinyl chloride or P.V.C. may be cited. A particularly preferred raw material of this type is a P.V.C. plastisol obtained from P.V.C. polymerized in the emulsion form and having a K value within the range of 65 to 75, and from a primary plastisol, by reason of 65 to 85% of plasticizer for 100 parts of polyvinyl chloride.

The P.V.C. content of the plastisol is dependent on the desired physical and practical properties of the final product, i.e. the ball, such as resilience, resistance to low temperatures, etc.

A primary plasticizer suitable for the plastisol was sought. 2-ethylhexylphthalate, also referred to as dioctylphthalate (DOP) is extremely volatile, as confirmed by actual tests performed in a hot-air drying room or vessel. Tests accomplished with polymer plasticizers of the polyester type yielded blends having very good ageing properties, but the resistance to low temperatures, below $0°$ C., as checked according to the Clash- Berg method, did not prove sufficient. Thus, rebound properties are modified as well as the steps for carrying out the method; for instance, the jellification step is more delicate.

On the other hand, very satisfactory results are obtained when a compound selected from the group comprising di-isodecyl phthalate (DIDP), di-tridecyl phthalate (DTDP), phthalates of $C_7$–$C_{11}$ and $C_9$–$C_{11}$ oxo linear alcohols, sold by the Shell Company under the Trade Names of Linevol 711 (TL 711P) or Linevol 911 (DL 911P), is used as a plasticizer.

Laboratory tests were performed by using a mixture consisting of 100 parts of PVC in suspension, having a K value of 70, and 40 to 60 parts of plasticizer, this mixture further containing adequate stabilizers such as epoxydized soybean oil, organic derivatives of the and organic phosphites, affording a conversion of the material at a relatively high temperature (in the case of PVC), i.e. 200° C. to 210° C.

The results thus obtained are shown in the following Table:

ment in the compressive strength of the mixture, and also of the flexion module, the resistance to abrasion, the surface hardness and the rigidity, thus reducing the distortion of the external layer and increasing very slightly the tensile strength. The surface condition of the ball is improved as well as its susceptibility to water. During the manufacture, the molded articles are also stripped with greater facility.

In the case of play-balls for children wherein rebound properties and weight are not essential factors, hollow microballs of very low density (0.3 to 0.6) have been used. The ball has thus a reduced density and its rebound is therefore increased considerably.

The bridging agents are of the titanate type, or alternatively of the silane type. Silanes are illustrated by the general formula:

$$R'Si(OR)_3$$

wherein R is an alkyl group and R′ an organo-functional group linked as a rule by a short alkyl chain to the

| Property | Method | Units | per | DOP | DL711P | DIDP | DL911P | DTDP |
|---|---|---|---|---|---|---|---|---|
| Modulus of elonga- | BSI/2782 | kg/cm² | 50 | 120 | 125 | 140 | 140 | 160 |
| tion at 100 % | 301 D | MN/m² | 50 | 11.8 | 12.3 | 13.7 | 13.2 | 15.7 |
| Efficiency | | | | | | | | |
| BS Number | BSI/2782 | | 40 | 23 | 19 | 12 | 12 | 6 |
| Softness | 307 A (2) | | 50 | 34 | 33 | 19 | 20 | 10 |
| | | | 60 | 73 | 75 | 76 | 77 | 93 |
| | ASTM D | Shore | 40 | 89 | 91 | 92 | 92 | 97 |
| | 1076 61 | A | 50 | 79 | 82 | 84 | 84 | 95 |
| Shore hardness A | | | | | | | | |
| | | | 60 | 73 | 75 | 76 | 77 | 93 |
| Performances at | | | | | | | | |
| low temperature | ASTM | | | | | | | |
| Tf Clash & Berg | 1043 69 | °C. | 50 | −25 | −30 | −20 | −35 | −20 |
| Cold flex | BSI/2782 | | 50 | −14 | −20 | −12 | −22 | −12 |
| id. after 7 days | 104 B | °C. | 50 | −5 | −14 | −6 | −21 | −10 |
| at 100° C. | | | | | | | | |
| Volatility : loss | | % of loss | | | | | | |
| after 7 days : | | of | | | | | | |
| | | weight | | | | | | |
| at 100° C. | | | 50 | 6.2 | 2.2 | 2.5 | 1.1 | 0.9 |
| at 121° C. | * * | | 50* | | | 2.9 | 1.7 | 1.7 |
| at 136° C. | | | 50* | | | 4.5 | 4.5 | 5.7 |

ASTM = American Society of Testing Materials
BSI = British Standard Institution
per = percent of PVC resin.

The ball deformation is also reduced by incorporating, in said external plastisol layer, fillers consisting notably of glass micro-balls treated by means of a specific bridging agent permitting the use of said micro-balls in combination with polyvinyl chloride. These micro-balls may be hollow or solid and have a variable density in the range of 2.4 to 2.95, and a size in the range of 5 to 50 microns.

These micro-balls are treated in a manner known per se. Pre-treated balls are used preferably; however, untreated micro-balls may also be used, the bridging agents being added directly to the PVC and plasticizer mixture before adding the micro-balls.

These micro-balls not only exert a favourable influence on the mechanical properties of the mixture, but also permit of controlling very accurately the mixture density as a function of the amount of micro-balls added to the mixture.

In the case of micro-size spheres having a granulometry of no more than about 44 microns, the addition of complementary amounts of these micro-balls, even in reduced number, for example in the proportion of 5 to 15% by weight of the plastisol content, is attended by a reduction in the ultimate elongation and by an incresilicon atom and capable of reacting with an organic polymer. The OR groups are adapted to be hydrolysed, R designates preferably a methyl or ethyl radical. The bond between silicon and the carbon atom of the organo-functional group R′ imparts to the latter a good stability to hydrolysis. R′ may be a vinyl, methacrylic, epoxy, mercaptan or amine group.

Preferred examples of silanes suitable for carrying out the present invention are those selected from the group comprising vinyltriethoxysilane, vinyltrimethoxysilane, vinyl-tris(β-methoxy-ethoxy)silane, γ-aminopropyltriethoxysilane, γ-methacryloxypropyltrimethoxysilane, β(3,4-epoxycyclohexyl)-ethyl-trimethoxysilane, γ-glycidoxypropyltrimethoxy-silane, vinyltriacetoxysilane, γ-merceptopropyltrimethoxysilane, N-β-(aminoethyl γ-aminopropyltrimethoxysilane, γ-chloropropyltrimethoxysilane and N-(β-ethylenediaminoethyl)-γ-aminopropyl-trimethoxysilane.

The structure of this external layer may also be modified by adding chemical agents such as swelling agents capable of modifying the appearance and, very slightly, the rebound damping action of this outer layer.

Although the choice of the swelling agent is not limited, a specific example thereof is 1.1-azobisformamide or azodicarbonamide in the form of a very finely divided product. This swelling agent is available commercially under the Trade Marks "Azocel" manufactured by Fairmount Chemicals Co., "Celogen AZ" produced by Uniroyal Chemical, "Ficel AC" of Fisons, "Kempor" of National Polychemicals, "Porofor ADC" of Bayer A.G. and "Ferupor AZ" of Organo-synthesis (Chevassus).

Azodicarbonamide is available in the form of a yellow to orange powder, according to its particle size; when implemented, it decomposes completely into a non-staining, cream-colored product. This swelling agent is advantageous in that it is odorless, non-staining and non-toxic. It is added in amounts up to 0.2 to 1% by weight as a function of the desired density; decomposition promotion agents such as zinc salts, cadmium salts or tin salts may be used in order to obtain a more regular cellular structure.

The internal layer consists preferably of a substance of the TPR type manufactured by Uniroyal Corp., or better still of a polyester-polyether resin such as the product known under the Trade Mark "Hytrel" marketed by Du Pont de Nemours, which is a block copolymer comprising an aromatic polyester block of crystalline nature having the following unit:

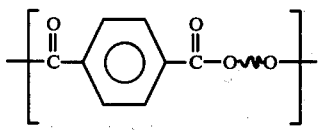 (I)

or hard segment, having a relatively high softening point (155° C.), and an amorphous polyester block according to the following unit:

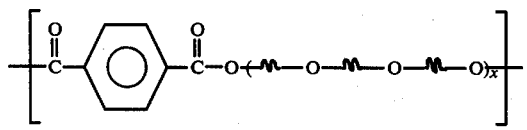 (II)

or flexible segment, having its vitrous transition point Tv at −55° C.

This polymer, of which the vitrous transition point Tv is extremely low (below −50° C.), is characterized by a very high ultimate strength, of the order of 400 kg/sq.cm, and a very high elongation at rupture which varies according to the type of polymer between 500 and 800%. Its remanent distortion after compression is very low. Its specific gravity lies in the range of 1.17 and 1.22 permitting its utilization as a material for constituting the internal layer of the ball.

This polymer thermoplastic material is also adequate on account of its resilience, its resistance to impacts and flexion fatigue. It can be used safely in the temperature range of −50° C. to +150° C. Therefore, it complies more satisfactorily than polyurethane polyesters with the various requirements set forth hereinabove.

Its apparent modulus of rigidity varies only very slightly; whereas in the case of thermoplastic polyurethane having a Shore A hardness of 91, this modulus is of the order of 100 to 400 kg per sq.cm. at temperatures of 27° C. to 18° C., compared with 140 to 210 kg/sq.cm. at a temperature of −18° C. in the case of Hytrel polyester having a Shore A hardness of 92. Besides, the ageing properties of this product are very satisfactory.

The Hytrel-type products may also be modified for obtaining a predetermined resilience as a function of the desired rebound property. These modifications may be brought by adding vinyl ethylene-acetate copolymers, the properties thus obtained varying as a function not only of the vinyl acetate content but also of the melt index. The addition of PVC, styrene-butadiene-styrene polymers (SBS), T.P.R. or polyethylene makes it possible to obtain a range of finished products having very variable properties.

When utilizing a Hytrel elastomer or a mixture containing this product, or similar substances, the presence of humidity in the resin may cause bubbles to develop therein as well as a rough inner surface. For this purpose, the polymer was dried according to the processes disclosed in Du Pont de Nemours "Bulletin No. A 87,313 entitled "Extrusion and Implementing".

The technique known under the term "rotational molding" is advantageously utilized for manufacturing a competition ball according to this invention.

The method of manufacturing this competition ball consists in melting successively, in a spherical mold made of two complementary portions and to which a planetary motion is imparted, the various thermoplastic materials constituting the ball, from the external layer to the internal layer, the material constituting an internal layer being introduced after opening the mold at a temperature such that the material constituting the preceding layer or layers has not melt completely, thus permitting the breaking of said layer or layers at the level of the joint between the two complementary mold portions. Thus, the successive layers are uniformly distributed and adhere perfectly to one another.

Preferably, the mold is a cast aluminium mold of which the two complementary portions are connected without any play along a joint plane; however, a mold of which the two complementary portions comprise stepped edges permitting the interfitting of said portions may be used, if desired.

Another feature characterizing the method of this invention consists in promoting said breaking of the layer externally of the joint plane by means of a ring of inert material, such as Teflon, inserted between the two complementary mold portions and projecting somewhat towards the inner part of the mold, said ring being adapted to be torn off after opening the mold at the end of the first curing operation, in the case of a two-layer ball.

However, the use of this tear-off ring is optional, especially if the mold consists of two interfitting portions or sections.

A typical form of embodiment of a thermoplastic ball according to this invention will now be described more in detail by way of example, not of limitation, with reference to the attached drawing illustrating diagrammatically:

In FIG. 1 an exploded perspective view of the mold for manufacturing this ball and In FIG. 2 an elevational and part-sectional view of the mold of FIG. 1.

The mold illustrated in the drawing is an aluminum foundry mold comprising two semi-spherical halves or sections 1 and 2 assembled at a joint plane 3. The inner diameter D of this mold corresponds to the outer diameter of the inflated ball. Conventional cooling means (not shown) are incorporated in the mold for cooling the latter during its rotation.

This mold is disposed in an oven in which it is driven along a planetary path by means not shown but well known in the art. Thus, the oven may comprise an arm carrying a tray rigid with the mold and to which a movement of rotation about two perpendicular axes is imparted.

The oven can be heated to temperatures as high as 350° C.

The thermoplastic material contemplated for forming the external layer of a two-layer ball is introduced into the mold and then driven along a planetary path adapted to form within the mold a regular layer of this material which covers the entire inner surface of the mold.

Before the material has molten completely, i.e. at about 120° C. in the case of a PVC plastisol, the mold is extracted from the oven and opened immediately without cooling it, so as to break the film of viscous material at the level of the joint plane and along its periphery. This operation is facilitated by the overpressure prevailing in the mold.

In certain cases, this breakage may also be promoted by providing a ring 4 of inert material such as Teflon, which is inserted into the joint plane 3, the ring having a thickness of about 1 mm and an inner diameter smaller than the inner diameter of the mold, this difference being for example of the order of 10 mm. This ring provides a lip flush with the meniscus 5 of the external thermoplastic layer 6 of which the continuity is broken, as shown in FIG. 2.

After opening the mold, the ring is removed, if necessary, and the thermoplastic raw material for constituting the internal layer of the ball is introduced.

Then the assembly is heated during another cycle in order to melt the material constituting the internal layer, to spread it uniformly and cause same to adhere perfectly to the first layer which, during this operation, will become sealed again at the level of the joint plane and continue to melt in order to attain the optimum mechanical properties.

When the two successive films are uniformly distributed and adhere perfectly to each other, the mold is cooled and the article stripped therefrom.

The choice of the materials constituting either of these layers may vary within wide limits, and third products may be used for promoting the adherence of the two layers, and a complementary layer may even be applied, if desired, through the same means for further improving the final properties of the ball.

The two mold sections or portions are formed in the known manner with inner rib 7 for reproducing the usual surface grooves of the ball; and an inflating valve 8 is also provided for.

Of course, the present invention should not be construed as being strictly limited to the above-described specific form of embodiment thereof, since various modifications and changes may be brought thereto without departing from the basic principles of the invention as set forth in the appended claims.

EXAMPLE

A "soccer" ball is manufactured by applying the well-known rotational molding technique and using on the one hand a PVC plastisol having a Shore hardness A of less than 60 to form the external, so-called contact layer, and on the other hand a thermoplastic polyester having a modulus of elasticity of 100 kg/sq.cm at 100%, an ultimate strenght of 400 kg/sq.cm. and a Shore D hardness of 50, for the internal, armature-forming layer adapted to withstand an internal pressure of the order of 600 to 700 grams per sq. cm. during the inflation, without undergoing any appreciable distortion.

What is claimed as new is:

1. Method of manufacturing a thermoplastic ball consisting of an external layer and at least one internal layer, comprising the steps of
    (a) introducing the amount of thermoplastic material required to form the external layer of the ball into a spherical mold, the mold being formed of two separable complementary sections,
    (b) heating the mold while imparting planetary motion to the mold to form the external layer of the ball,
    (c) opening the mold by separating the complementary sections at a temperature at which the thermoplastic material in the mold has not completely melted to break the thermoplastic material at the junction of the complementary sections,
    (d) introducing the amount of thermoplastic material required to form one internal layer of the ball into the mold,
    (e) closing the mold and then heating the mold while imparting planetary motion to the mold to form an internal layer of the ball adjacent to and fused with the external layer;
    (f) cooling the mold and stripping the ball therefrom, said method further including, before said introducing step, inserting a ring between the complementary sections of the mold to form a lip projecting inside of the mold, said lip promoting breaking of at least one molded layer,
    and stripping said ring when the mold is opened after formation of the said at least one layer of the ball.
2. The method of claim 1 wherein said ring is made of Teflon.
3. The method of claim 1 including repeating steps (c), (d) and (e) and forming at least one additional internal layer in said mold.